Jan. 28, 1941.                E. DUNFORD                2,230,136
                              EDGE TRIMMER
                          Filed Feb. 1, 1940

INVENTOR:
Ernest Dunford
BY Rodney Bedell
ATTORNEY

Patented Jan. 28, 1941

2,230,136

UNITED STATES PATENT OFFICE 2,230,136

EDGE TRIMMER

Ernest Dunford, St. Louis, Mo., assignor to Landis Machine Company, St. Louis, Mo., a corporation of Missouri Application February 1, 1940, Serial No. 316,753

6 Claims. (Cl. 12—92)

The invention relates to rotary cutters such as are used in shoe finishing machinery and more particularly to edge trimmers used in trimming the edges of shoe soles.

The trimming operation usually is performed after the soles have been stitched to the uppers and, since the soles vary considerably in thickness, edge trimmers are provided with cutters of various widths to conform to the thickness of the shoe sole ranging from women's thin soled shoes to men's thick soled work shoes. The cutters have a series of teeth arranged on the periphery thereof, and the teeth include a sole edge engaging portion and a portion inclined thereto. The angle of inclination between the portions differs in various cutters and depends on the kind of shoe being trimmed and other factors.

The edge trimmer includes also a guard having lugs which mesh with the teeth of the cutter and which are inclined at an angle thereto. When the guard and cutter are positioned properly relative to each other, the guard lugs extend beyond the inclined portion of the cutter teeth. When the cutter is changed to accommodate soles of substantially different thicknesses, it may be necessary to change the guard with the cutter. In many instances, it is necessary to provide the cutters and guards in matched sets to insure accurate trimming of the shoe soles.

If the cutter and guard are not adjusted properly relative to each other, too large a portion of the sole corners may be cut away during the trimming operation.

To overcome this difficulty edge trimmers have been provided whereby the guard may be moved axially relative to the cutters, but in the devices as used heretofore the adjustment was made by radial set screws or other mechanisms requiring complicated movements to operate. For instance, when set screws are employed for this purpose, the shaft must be turned to a favorable position, and a screw driver is needed to release and tighten the screw. These movements require considerable time.

To overcome the difficulties of edge trimmers as used heretofore, my invention contemplates an edge trimmer comprising a cutter and a guard adjustable relative thereto. The adjusting mechanism is arranged so that when the guard is in adjusted position relative to the cutter, the guard automatically remains in that position.

One object of this invention is to provide an edge trimmer wherein the guard may be adjusted to expose portions of the cutter teeth corresponding in width to the thickness of the sole being trimmed.

Another object is to provide an edge trimmer wherein the guard may be adjusted manually relative to the cutter without the use of tools or devices.

A more specific object is to provide an edge trimmer wherein the guard will be maintained in adjusted position automatically relative to the cutter.

Other objects and advantages will appear from the following description of the structure illustrated in the accompanying drawing in which.

Figure 1:
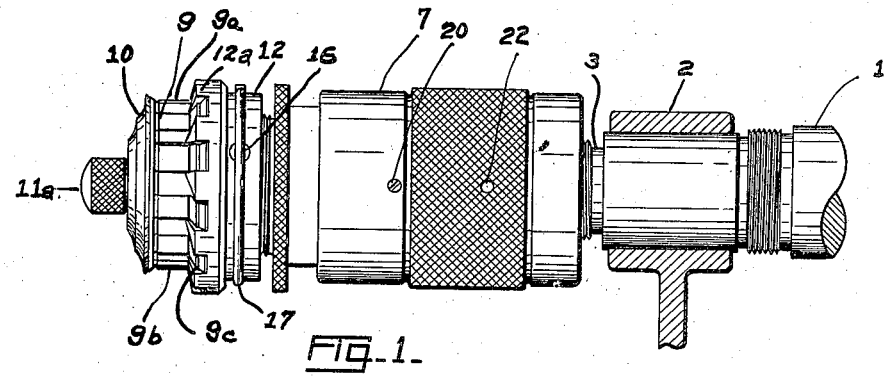
Figure 1 is a side elevation of an edge trimmer constructed according to this invention.
Figure 2:
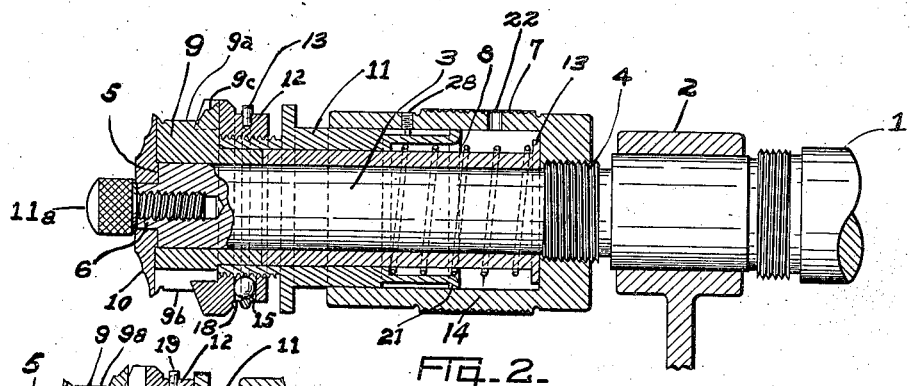
Figure 2 is a longitudinal section taken on the line 2—2 of Figure 1.
Figure 3:
Figure 3 is a detail similar to Figure 2 but showing the parts in a different position.
Figure 4:
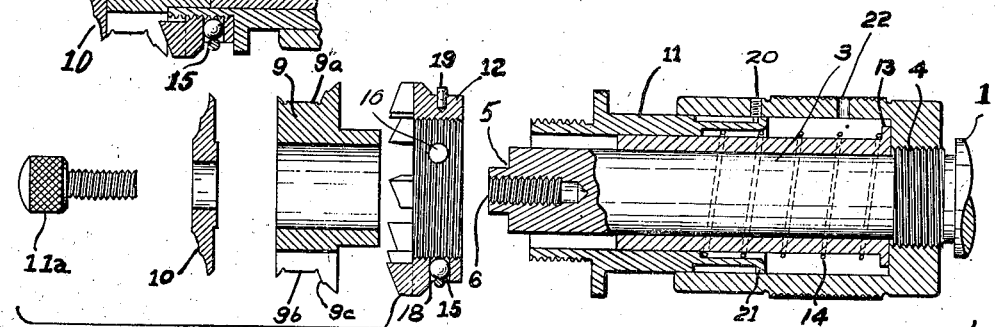
Figure 4 is an exploded view of the edge trimmer showing the parts separated.

The general arrangement corresponds to that shown in Patent No. 2,162,944, issued June 20, 1939, to the present applicant and includes a shaft 1 journalled in a bearing 2 of the finisher. Shaft 1 includes a spindle 3 threaded at 4 and terminating in a portion having a shoulder 5 and interiorly threaded at 6. A cylindrical casing 7 is threaded at one end to threaded portion 4 of spindle 3 so that casing 7 may be adjusted axially on spindle 3. A spacer 8 is mounted loosely on spindle 3 and is arranged thereon so that one end of the spacer abuts casing 7 at the threaded portion and the other end of spacer 8 extends from the open end of the casing. Also mounted on spindle 3 and abutting the end of spacer 8 is a cutter 9 having a series of peripheral teeth 9a each including a portion 9b substantially parallel to spindle 3 and a portion 9c inclined thereto. Cutter 9 is retained on spindle 3 by a collar 10 attached to the spindle by a screw 11a threaded into the end of the spindle. The periphery of the collar projects radially a short distance beyond the edges of the adjacent portions of the cutter teeth to protect the shoe sole from the edges of the teeth.

Mounted freely on spacer 8 and adapted to move axially relative thereto is a sleeve 11 forming a support for a guard 12 threaded on the end of the sleeve adjacent cutter 9. Guard 12 comprises a series of lugs 12a with their outer ends arranged at an angle to spindle 3 and extending radially between cutter teeth 9a, thus overlapping a portion of cutter 9. Guard 12 may be moved axially relative to cutter 9 and spacer 8 by rotating sleeve 11 relative to guard 12, thereby varying the portion of guard 12 overlapping cutter 9 to change the effective width of the cutter exposed to the work surface. Throughout the description, by the phrase "effective width of the cutter" is meant the portion of cutter 9 exposed to the work surface when guard 12 is free to move toward cutter 9 and sleeve 8 abuts the cutter.

Encircling spacer 8 and abutting a flange 13 formed at the end thereof, remote from cutter 9 is a compression spring 14 engaging sleeve 11 and thrusting the sleeve into abutment with cutter 9. As the edge of the sole is finished, the face of the sole is pressed against guard lugs 12a and spring 14 is compressed to clear the inclined portions of the cutter teeth to turn the corner of the sole.

Guard 12 and sleeve 11 are prevented from rotating relative to each other and are maintained in adjusted position with cutter 9 by a frictional device comprising a plurality of steel balls 15 positioned in openings 16 in guard 12 and maintained in engagement with the threaded portion of sleeve 11 by a resilient split ring 17 arranged in a groove 18 in guard 12. Fastened securely to guard 12 and positioned in the groove formed therein is a pin 19 located between the ends of ring 17 to hold ring 17 against movement relative to guard 12 and thereby prevent the gap between the ends of ring 17 aligning with one of balls 15 and rendering the latter ineffective or making it possible for the ball to be lost.

To limit movement of sleeve 11 and guard 12 axially on spindle 3 when the cutter is removed therefrom, a screw 20 is threaded into casing 7 and engages a flange 21 formed at the end of sleeve 11 remote from guard 12 and positioned within casing 7. Also, casing 7 is provided with an oil opening 22. The peripheries of sleeve 11 and cylindrical casing 7 are knurled to provide a firm grip for the operator.

The device operates as follows:

When shoes having soles of various thicknesses are to be trimmed, the exposed face of the cutter may be adjusted so that the effective width thereof corresponds to the width of the work surface by rotating sleeve 11 relative to guard 12 whereby guard 12 moves axially of sleeve 11 toward or away from cutter 9, thus varying the portion of guard 12 overlapping the cutter. In operating position cylindrical casing 7 is positioned on spindle 3 so that it engages the end of spacer 8 and forces the spacer into abutment with cutter 9 whereby the cutter is locked to and rotates with spindle 3. When it is necessary to replace cutter 3, casing 7 is rotated on threaded portion 4 of spindle 3 to release cutter 9 from the locking thrust of spacer 8 whereby screw 11a may be readily loosened and, with collar 10 and cutter 9, may be removed from the spindle. Guard 12 is maintained in position relative to cutter 9 by compression spring 14 which thrusts sleeve 11 yieldingly into abutment with cutter 9.

From the above description it will be apparent that an edge trimmer constructed according to this invention may be adjusted so that the effective width of the cutter corresponds to the width of the work surface without removing or replacing the cutter or guard. Also, adjustment of the guard relative to the cutter may be made manually without the use of screws, nuts, screw drivers, wrenches, or other like elements and tools. For this reason shoe soles of various widths may be trimmed quickly and easily on an edge trimmer constructed according to this invention.

While I have described one embodiment of the invention, it will be apparent to those skilled in the art that other arrangements may be used without deviating from the scope of the invention as defined in the accompanying claims.

What is claimed is:

1. In an edge trimmer device, a cylindrical casing open at one end and threaded at the other end for application to an operating shaft, a spacer in said casing with one end abutting the inner threaded end of said casing and with its other end projecting beyond the open end of said casing, a cutter having a face abutting said spacer, a sleeve mounted on said spacer to move longitudinally thereof and having an end abutting said cutter, and a cutter guard overlapping a portion of said cutter and threaded on said sleeve so that the portion of said guard overlapping said cutter may be varied.

2. In an edge trimmer device, a cylindrical casing open at one end and arranged at the other end for application to an operating shaft, a spacer slidable in said casing with one end abutting the inner face of the latter mentioned end of said casing and with its other end projecting beyond the open end of said casing, a cutter having a face abutting said spacer, a sleeve mounted freely on said spacer, a spring thrusting said sleeve into abutting relation with said cutter, and a guard on said sleeve and overlapping a portion of said cutter, said guard and sleeve being relatively adjustable longitudinally of the device so that the portion of said guard overlapping said cutter may be varied.

3. An edge trimmer device as described in claim 2 which also includes a friction device between the sleeve and guard for maintaining the guard in adjusted position on the sleeve.

4. An edge trimmer device as described in claim 2 which also includes a friction device between the sleeve and guard for maintaining the guard in adjusted position on the sleeve, said friction device comprising a plurality of balls movable radially in said guard, and spring means thrusting said balls against said sleeve.

5. In combination, a shaft, an edge trimmer cutter thereon, a part mounted to move axially of said shaft, a cutter guard carried on said part and arranged to overlap a portion of said cutter and being movable with said part axially relative to said cutter, yielding means thrusting said part towards said cutter, means operable by relative rotation of said guard and part for limiting the overlapping movement of said guard relative to said cutter, and a friction device resisting such relative rotation to maintain said guard and part in adjusted position, said device yielding readily to manual rotation of said guard and part in opposite directions to accommodate adjustment of said guard and cutter.

6. In combination with an operating shaft, an edge trimmer cutter mounted thereon and having spaced teeth, a sleeve slidable longitudinally of said shaft, a spring thrusting said sleeve into abutting relation with said cutter, and a guard on said sleeve and having elements projecting between and overlapping a portion of the cutter teeth to determine the effective width of said teeth, said guard being adjustable on said sleeve relative to said cutter to vary the overlapping of said elements and teeth, and friction means normally holding said guard and sleeve together so that they be moved as a unit towards and away from said cutter, said guard being movable manually relative to said sleeve by overcoming said friction means.

ERNEST DUNFORD.